US008527187B2

(12) United States Patent
Hamama et al.

(10) Patent No.: US 8,527,187 B2
(45) Date of Patent: Sep. 3, 2013

(54) SYSTEMS AND METHODS FOR DIGITAL SIGNAL PROCESSING

(75) Inventors: Wajdi B. Hamama, Whitmore Lake, MI (US); John F. Van Gilder, Webberville, MI (US)

(73) Assignee: GM Global Technology Operations LLC

( * ) Notice: Subject to any disclaimer, the term of this patent is extended or adjusted under 35 U.S.C. 154(b) by 1413 days.

(21) Appl. No.: 11/717,802

(22) Filed: Mar. 13, 2007

(65) Prior Publication Data

US 2008/0224888 A1 Sep. 18, 2008

(51) Int. Cl.
*G06F 19/00* (2011.01)
*G06G 7/70* (2006.01)

(52) U.S. Cl.
USPC ............... 701/111; 701/1; 701/101; 701/102; 123/406.34; 123/406.37; 123/406.38; 123/406.39

(58) Field of Classification Search
USPC .... 701/1, 36, 99, 101, 102, 111; 123/406.16, 123/406.21, 406.29, 406.34, 406.37, 406.38, 123/406.39; 73/35.01, 35.09, 35.02
See application file for complete search history.

(56) References Cited

U.S. PATENT DOCUMENTS

| | | | | |
|---|---|---|---|---|
| 5,717,133 | A * | 2/1998 | Wu et al. | 73/114.04 |
| 6,314,802 | B1 * | 11/2001 | Wu et al. | 73/114.04 |
| 7,386,371 | B2 * | 6/2008 | Kuge et al. | 701/1 |
| 7,467,544 | B2 * | 12/2008 | Wang et al. | 73/129 |
| 7,522,090 | B2 * | 4/2009 | Hawkinson | 342/64 |
| 2005/0159851 | A1 * | 7/2005 | Engstrom et al. | 701/1 |
| 2005/0234632 | A1 * | 10/2005 | Masuda et al. | 701/111 |
| 2006/0058154 | A1 | 3/2006 | Heckel et al. | 477/97 |
| 2006/0229769 | A1 * | 10/2006 | Grichnik et al. | 701/1 |
| 2007/0213885 | A1 * | 9/2007 | D'Silva et al. | 701/1 |

FOREIGN PATENT DOCUMENTS

| | | |
|---|---|---|
| CN | 1686781 | 10/2005 |
| JP | 60189643 | 9/1985 |
| JP | 6179325 | 6/1994 |
| JP | 2002340169 | 11/2002 |
| JP | 2007170238 | 7/2007 |

OTHER PUBLICATIONS

"Statistics for Experimenters—An Introduction to Design, Data and Analysis, and Model Building" by George E.P. Box, William G. Hunter, and J. Stuart Hunter. John Wiley & Sons. ISBN 0-471-09315-7; 2 pages. Jun. 22, 1978.*

Chen Youchen, Conducting Analysis of Variance with Sample Average and Standard Deviation, China Milk, Jun. 30, 1987. Copy of letter from Chinese Patent Application No. 200810083360.7 with translated title of document. 7 pages.

(Continued)

*Primary Examiner* — Thomas Tarcza
*Assistant Examiner* — Rami Khatib

(57) ABSTRACT

A control system for a vehicle is provided. The control system includes a signal processing module that receives a sensor signal and extracts a plurality of sample points from the sensor signal. A computation module computes a summation of the sample points, computes a summation of squares of the sample points, and computes a standard deviation based on the summation of the sample points and the summation of the squares of the sample points. A control module generates a control signal based on the sensor signal and the standard deviation.

14 Claims, 3 Drawing Sheets

(56) References Cited

OTHER PUBLICATIONS

"Statisitics for Experimenters—An introduction to Design, Data and Analysis, and Model Building" by George E.P. Box, William G. Hunter, and J. Stuart Hunter. John Wiley & Sons. ISBN 0-471-09315-7; 2 pages, Jun. 22, 1978.
Office Action dated Sep. 28, 2012 from the Indian Patent Office for Indian Patent Application No. 302/KOL/2008; 2 pages.

* cited by examiner

SYSTEMS AND METHODS FOR DIGITAL SIGNAL PROCESSING

FIELD

The present disclosure relates to methods and systems for processing digital signals in a vehicle control system.

BACKGROUND

The statements in this section merely provide background information related to the present disclosure and may not constitute prior art.

Vehicles include an internal combustion engine that generates drive torque. More specifically, the engine draws in air and mixes the air with fuel to form a combustion mixture. The combustion mixture is compressed and ignited to drive pistons that are disposed within the cylinders. The pistons rotatably drive a crankshaft that transfers drive torque to a transmission and wheels. A knock sensor generates a knock signal based on a vibration of the engine. Disturbances in the knock signal, such as from background noise, can cause inaccurate engine knock determinations and, therefore, may cause one or more vehicle subsystems to operate inefficiently.

Conventional methods of processing the knock signal for background noise include moving averages methods, first order lag filters, and a full standard deviation computation. The use of a full standard deviation computation method provides superior description of the sample distribution to the moving averages methods and the first order lag filters. A commonly known equation for the full standard deviation includes:

$$\text{Standard Deviavtion} = \sqrt{\left[\frac{\sum_{i=1}^{i=N}(d_i - \overline{d})^2}{(N-1)}\right]}. \tag{1}$$

Where $d_i$ is a sample point, $\overline{d}$ is the average of the sample points, and N represents the number of sample points. This full standard deviation computation method requires a buffering for every point that is part of the distribution or alternatively using highly throughput-intensive data manipulation in order to produce an average and standard deviation. Thus, to achieve superior signal processing, large amounts of controller memory and throughput must be added. Increased processor throughput and additional memory can be costly to the controller.

SUMMARY

Accordingly, a control system for a vehicle is provided. The control system includes a signal processing module that receives a sensor signal and extracts a plurality of sample points from the sensor signal. A computation module computes a summation of the sample points, computes a summation of squares of the sample points, and computes a standard deviation based on the summation of the sample points and the summation of the squares of the sample points. A control module generates a control signal based on the sensor signal and the standard deviation.

In other features, a method of processing a sensor signal for a vehicle is provided. The method includes: processing a plurality of sample points from a sensor signal; computing a summation of the sample points; computing a summation of squares of the sample points; computing a standard deviation based on the summation of the sample points and the summation of the squares of the sample points; and generating a control signal based on the sensor signal and the standard deviation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
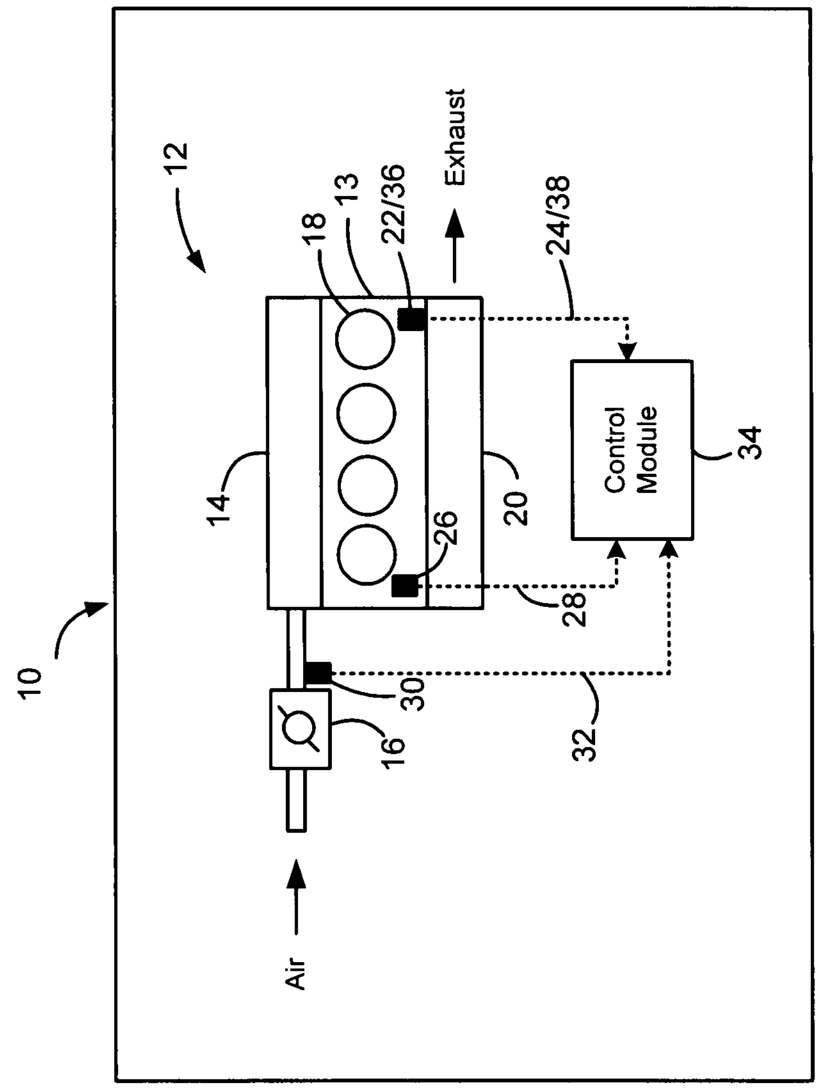
FIG. 1 is a functional block diagram illustrating a vehicle including an engine system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes various electronically-controlled systems. For example, an engine system 12 includes an engine 13 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, it can be appreciated that the engine 13 can have a plurality of cylinders 18, including, but not limited to, 2, 3, 5, 6, 8, 10, 12, and 16 cylinders. It is also appreciated that the engine 13 may, in the alternative, include a V-type cylinder configuration.

The air within the cylinders 18 is mixed with fuel and combusted therein. The combustion process drives a crankshaft (not shown) to produce drive torque. Combustion exhaust within the cylinders 18 is forced out through an exhaust manifold 20. The combustion exhaust is treated in an exhaust system (not shown). The engine system 12 includes various sensors that generate digital signals based on sensed information from the engine system 12. For example, an engine speed sensor 22 generates a digital engine speed signal 24 based on a rotational speed of the crankshaft. A knock sensor 26 generates a digital knock signal 28 indicating a vibration of the engine 13. A temperature sensor 30 generates a digital temperature signal 32 indicating a temperature of air entering the engine 13. As can be appreciated, the engine system 12 can include various other digital sensors. Hereinafter, one or more of the sensors discussed above will be commonly referred to as a digital sensor 36 that generates a digital signal 38.

A control module 34 receives one or more of the digital signals 38 from the digital sensors 36 of the engine system 12 and processes the digital signals 38 based on digital signal processing methods of the present disclosure. More particularly, the control module 34 computes a partial standard deviation for background noise picked up by the digital sensor 36 and generated in the digital signal 38. The partial standard deviation is then used to differentiate between normal noise and unwanted operation condition events. Based on the differentiation, the control module 34 can more efficiently interpret the digital signal 38 and control one or more components of the engine system 12. Similarly, the digital signal processing systems and methods of the present disclosure can apply to other electronically-controlled systems in the vehicle 10 that include digital sensors 36, such as, but not limited, a transmission system, a body system, and a throttle system. For ease of the discussion, the disclosure will be discussed in the context of an engine system 12.

Figure 2:
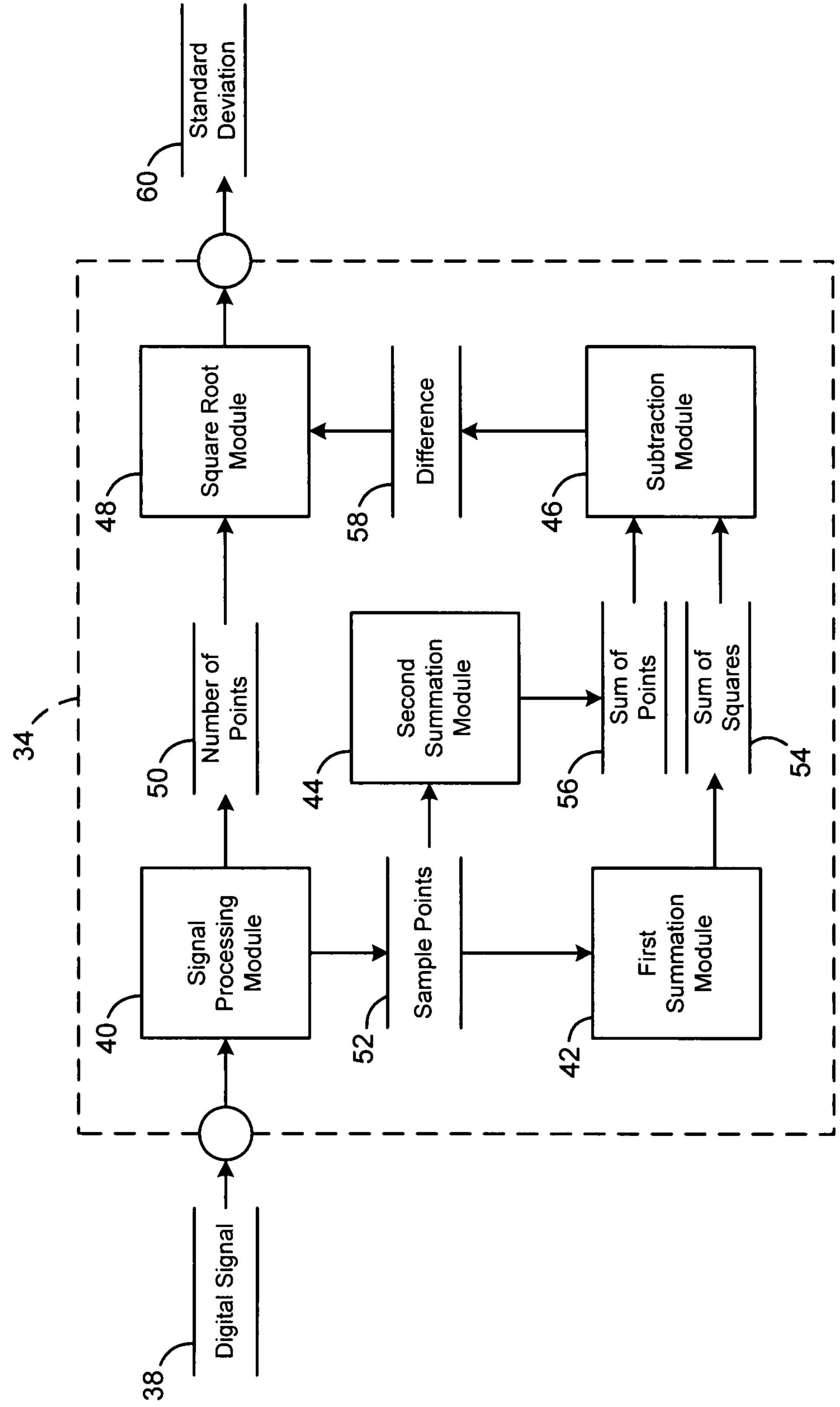
FIG. 2 is a dataflow diagram illustrating digital signal processing system in accordance with various aspects of the present teachings.

Referring now to FIG. 2, a dataflow diagram illustrates various embodiments of a digital signal processing system that may be embedded within the control module 34. Various embodiments of digital signal processing systems according to the present disclosure may include any number of sub-modules embedded within the control module 34. As can be appreciated, the sub-modules shown may be combined and/or further partitioned to similarly process the digital signal 38. Inputs to the system may be sensed from the vehicle 10 (FIG. 1), received from other control modules (not shown) within the vehicle 10 (FIG. 1), and/or determined by other sub-modules (not shown) within the control module 34. In various embodiments, the control module 34 of FIG. 2 includes a signal processing module 40, a first summation module 42, a second summation module 44, a subtraction module 46, and a square-root module 48.

The signal processing module 40 receives as input the digital signal 38. The signal processing module 40 extracts a number 50 of sample points 52 from the digital signal 38. A first summation module 42 receives as input the sample points 52. The first summation module 42 computes a square of each sample point 52 and a summation of the squares 54 of each sample point 52. A second summation module 44 receives as input the number 50 and the sample points 52. The second summation module 44 computes a summation of points 56 by computing a summation of the sample points 52, computing a square of the summation, and dividing the square by the number 50 of points.

The subtraction module 46 receives as input the sum of squares 54 and the sum of points 56. The subtraction module 46 computes a difference 58 between the sum of squares 54 and the sum of points 56. The square-root module 48 receives as input the difference 58. The square-root module 48 computes a partial standard deviation 60 by computing a quotient by dividing the difference by the number 50 of points minus one, and taking a square root of the quotient. The partial standard deviation 60 can then be used to calculate a signal-to-noise ratio. The signal-to-noise ratio is then used to process the digital signal 38 for controlling one or more components of the engine system 12 (FIG. 1).

Figure 3:
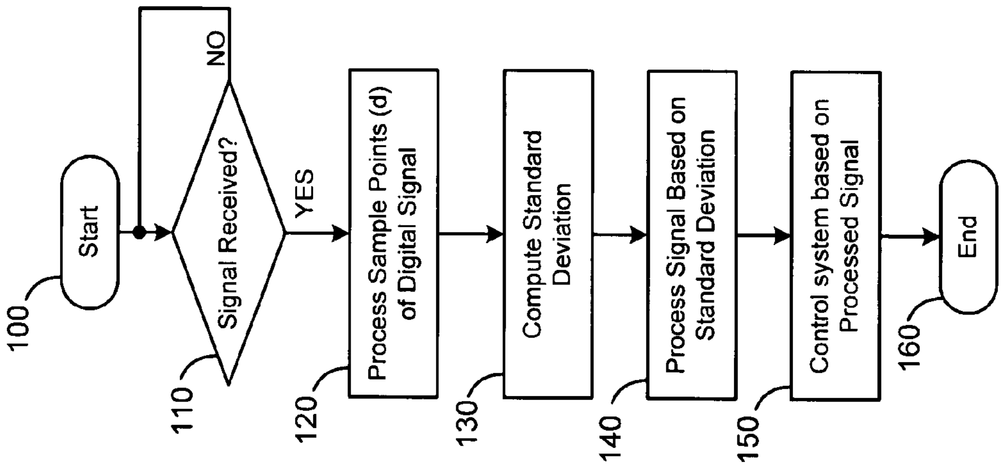
FIG. 3 is a flowchart illustrating a digital signal processing method in accordance with various aspects of the present teachings.

Referring now to FIG. 3, a flowchart illustrates various embodiments of a digital signal processing method that may be performed by the digital signal processing system of FIG. 2. In various embodiments, the digital signal processing method is scheduled to run periodically during vehicle operation. As can be appreciated, the digital signal processing method of the present disclosure is not limited to the sequential execution as shown in FIG. 3. In one example, the method may begin at 100. A presence of the digital signal 38 (FIG. 2) is evaluated at 110. If a digital signal 38 (FIG. 2) is received at 110, a number N of sample points $d_i$ are extracted from the digital signal 38 at 120. Otherwise, the method continues to monitor for the presence of the digital signal 38 at 110.

Once the number N of sample points $d_i$ are extracted from the digital signal 38 at 120, the partial standard deviation 60 is computed at 130. In various embodiments, the partial standard deviation 60 is computed based on the following equation:

$$\text{STANDARD DEVIATION} = \sqrt{\frac{\left\{\left[\sum_{i=1}^{i=N}(d_i)^2\right] - \left[\frac{\left(\sum_{i=1}^{i=N}(d_i)\right)^2}{N}\right]\right\}}{(N-1)}}. \tag{2}$$

The digital signal 38 can then be processed based on the partial standard deviation 60 to determine the actual signal-to-noise ratio at 140. Based on the signal-to-noise ratio and the digital signal 38, one or more components of the engine system 12 (FIG. 1) are controlled at 150. The method may end at 160.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for a vehicle, comprising:

a signal processing module that receives a sensor signal from an engine knock sensor and extracts a plurality of sample points from the sensor signal;

a computation module that computes a summation of the sample points, that computes a summation of squares of the sample points, and that computes a standard deviation based on the summation of the sample points and the summation of the squares of the sample points; and a control module that generates a control signal that controls combustion in an engine based on the sensor signal and the standard deviation.

2. The control system of claim 1 wherein the computation module computes the standard deviation based on a difference between the summation of the squares of the sample points and the summation of the sample points.

3. The control system of claim 2 wherein the computation module computes the standard deviation by dividing the difference by one less than a number of the sample points.

4. The control system of claim 3 wherein the computation module computes the standard deviation by computing a square root of a result of the dividing the difference by one less than the number of the sample points.

5. The control system of claim 1 wherein the computation module computes the summation of the sample points, computes a square of the summation of the sample points, and computes a quotient by dividing the square of the summation of the sample points by a number of the sample points, and wherein the standard deviation is computed based on the quotient.

6. The control system of claim 1 wherein the control module computes a sensor signal-to-noise ratio based on the standard deviation and generates a control signal based on the sensor signal and the sensor signal-to-noise ratio.

7. The control system of claim 1 wherein the control signal controls a transmission system based on the sensor signal and the standard deviation.

8. A method of processing a sensor signal for a vehicle, comprising:

generating a sensor signal using an engine knock sensor;

processing a plurality of sample points from the sensor signal;

computing a summation of the sample points;

computing a summation of squares of the sample points;

computing a standard deviation based on the summation of the sample points and the summation of the squares of the sample points; and generating a control signal that controls combustion in an engine based on the sensor signal and the standard deviation.

9. The method of claim 8 further comprising:

computing a square of the summation of the sample points; and computing a quotient by dividing the square by a number of the sample points, wherein the standard deviation is computed based on the quotient.

10. The method of claim 8 wherein the computing the standard deviation comprises computing the standard deviation based on a difference between the summation of the squares of the sample points and the summation of the sample points.

11. The method of claim 10 wherein the computing the standard deviation further comprises computing the standard deviation by dividing the difference by one less than a number of the sample points.

12. The method of claim 11 wherein the computing the standard deviation further comprises computing the standard deviation by computing a square root of a result of the dividing the difference by one less than the number of the sample points.

13. The method of claim 8 further comprising computing a sensor signal-to-noise ratio based on the standard deviation and wherein the generating the control signal is based on the sensor signal-to-noise ratio.

14. The method of claim 8 further comprising controlling a transmission system based on the sensor signal and the standard deviation.

* * * * *